(12) United States Patent
Hochendoner

(10) Patent No.: US 8,040,602 B1
(45) Date of Patent: Oct. 18, 2011

(54) FRAME ASSEMBLY FOR A PROJECTION SCREEN SYSTEM

(75) Inventor: David L. Hochendoner, Allison Park, PA (US)

(73) Assignee: Sima Technologies LLC, Hauppauge, NY (US)

( * ) Notice: Subject to any disclaimer, the term of this patent is extended or adjusted under 35 U.S.C. 154(b) by 228 days.

(21) Appl. No.: 12/231,882

(22) Filed: Sep. 5, 2008

Related U.S. Application Data

(60) Provisional application No. 60/967,925, filed on Sep. 7, 2007.

(51) Int. Cl.
*G03B 21/56* (2006.01)

(52) U.S. Cl. .................................... 359/443; 160/377

(58) Field of Classification Search .................. 359/443; 160/372, 377
See application file for complete search history.

(56) References Cited

U.S. PATENT DOCUMENTS

| | | | |
|---|---|---|---|
| 1,131,204 A * | 3/1915 | Bridges | 160/372 |
| 3,494,409 A * | 2/1970 | Prechtl et al. | 160/374.1 |
| 3,583,466 A * | 6/1971 | Dreyer | 160/351 |
| 3,720,455 A | 3/1973 | Sahlin | |
| 4,323,301 A | 4/1982 | Spector | |
| 4,597,633 A | 7/1986 | Fussell | |
| D323,338 S | 1/1992 | Court | |
| 5,400,178 A * | 3/1995 | Yamada et al. | 359/449 |
| D357,492 S | 4/1995 | Henry | |
| 5,502,906 A * | 4/1996 | Yamawaki | 38/102 |
| 5,982,537 A | 11/1999 | Koizumi et al. | |
| 6,008,938 A | 12/1999 | Suehle et al. | |
| 6,474,021 B2 * | 11/2002 | Homeyer | 49/57 |
| 6,681,833 B2 * | 1/2004 | Wylie | 160/381 |
| 2007/0153375 A1 * | 7/2007 | Peterson et al. | 359/443 |
| 2008/0094698 A1 * | 4/2008 | Enochs | 359/443 |

OTHER PUBLICATIONS

Sima Products Inflatable Home Theater Kit Product Sheets, Dec. 2008.

* cited by examiner

*Primary Examiner* — Chrisotpher Mahoney
(74) *Attorney, Agent, or Firm* — Tutunjian & Bitetto, P.C.

(57) ABSTRACT

A frame assembly is used to mount a screen. The frame assembly includes screen-perimeter members and frame-splice members. The splice members permit the perimeter members to be separated into segments.

10 Claims, 4 Drawing Sheets

FRAME ASSEMBLY FOR A PROJECTION SCREEN SYSTEM

CROSS REFERENCE TO RELATED APPLICATIONS

This application claims the benefit of copending U.S. Provisional Application Ser. No. 60/967,925, filed Sep. 7, 2007, by the same inventor, the entire content of which is hereby incorporated by reference herein.

BACKGROUND AND SUMMARY

Projection screens are used with projectors to present visual information to one or more viewers. In particular, relatively large projection screens can be used to present information to a relatively large number of viewers at the same time. Even when not necessary to accommodate a large group, viewers often appreciate relatively large projection screens. Typically, such projection screens are mounted on a structural support or frame assembly which spans the entire perimeter region of the projection screen and holds the projection screen substantially flat in an assembled viewing configuration.

However, storing and transporting large projection screens can raise many issues. The large size and awkward shape of projection screen systems makes them difficult to easily transport. For example, it is difficult and costly to transport a frame assembly for projection screens because screens are typically large in two dimensions and small in one dimension. This requires packages used to ship the frame assembly to be long enough to accommodate the longest dimension of the projection screen. Furthermore, the long thin boxes that most screen assemblies are shipped in may be vulnerable to bending. Thus, the screen and frame assembly may be easily damaged during transportation and may be difficult to store.

Some known solutions have attempted to mitigate these issues by providing screen frame assemblies capable of being assembled from smaller components, but such systems have not been entirely satisfactory in providing a straight, strong, and secure structure capable of holding the screen tight and substantially flat during viewing. Such systems have also not been entirely satisfactory in providing a frame assembly with a supporting structure which remains hidden from view so as to maintain a pleasing aesthetic appearance to the viewer from the viewing region.

To address these needs, the present invention provides a configurable frame assembly which may be selectively assembled and disassembled in a simple and cost effective manner for ease of shipping and storage, and which maintains rigid support for the projection screen without detracting from the aesthetic visual qualities of the viewing area of the projection screen system.

DETAILED DESCRIPTION

Figure 1:
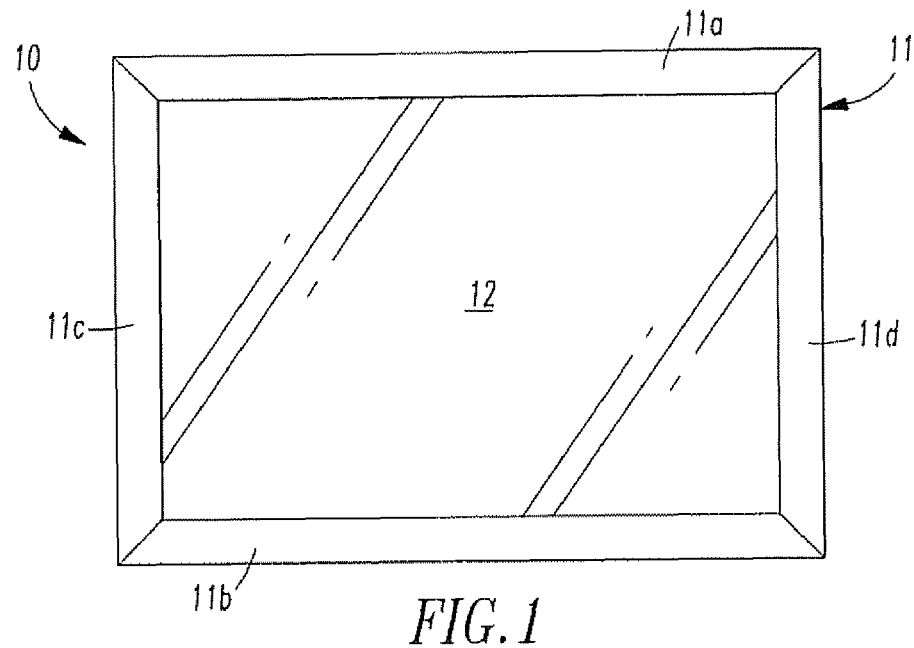
FIG. 1 is a front view of an exemplary embodiment of the screen frame assembly in accordance with the present invention.

Referring to the drawings, an image display system 100 may be configured to generate an image on a display surface 12 for viewing by a viewer. FIG. 1 is a schematic view of an exemplary embodiment of a screen assembly 10 including a screen 12 mounted on a structural support or frame assembly 11. The screen 12 may be composed of a variety of screen materials, including but not limited to flexible materials such as fabrics, plastics, etc. The frame assembly 11 typically comprises a plurality of screen-perimeter members 11a-d extending the four perimeter regions of the rectangular shaped screen 12. The frame assembly 11 is adapted to hold the screen substantially flat when the screen is in an assembled viewing configuration as shown in FIG. 1.

Figure 2:
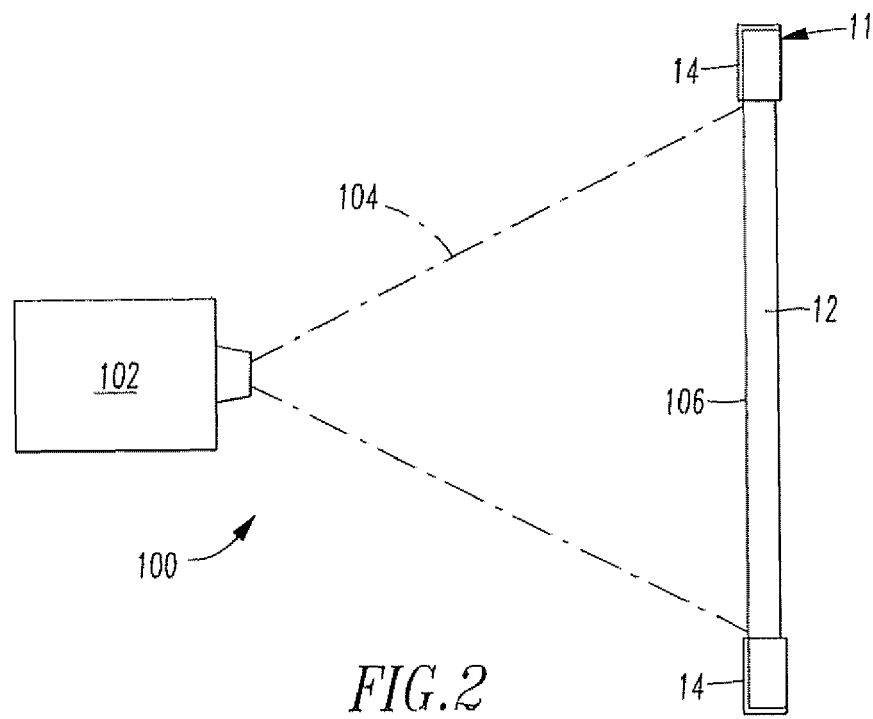
FIG. 2. illustrates an exemplary projection screen display system.

FIG. 2 provides a schematic illustration at 100 of an exemplary projection screen display system. As known in the art, display system 100 may include a display device, such as a projector 102. Projector 102 may be any suitable type of projection device, including, but not limited to, a digital projector, a liquid crystal display (LCD) projector, a digital light processing projector, a rear projector, a rear projection television, a front projector, etc.

Projector 102 may project or display an image (indicated at 104) to display surface 106 of screen 12. Display surface 106 may be any suitable surface configured to reflect, transmit, or otherwise display the projected image and direct the image displayed by projector 102 toward a viewer. A dark colored fabric 14, such as black electrostatic velvet fabric, may be used as an edge material covering the frame assembly 10 in such a way as to absorb light reflected from the screen 12, thus enhancing the visual quality of the image 104 and improving the decorative quality of the display system 100.

Figure 3:
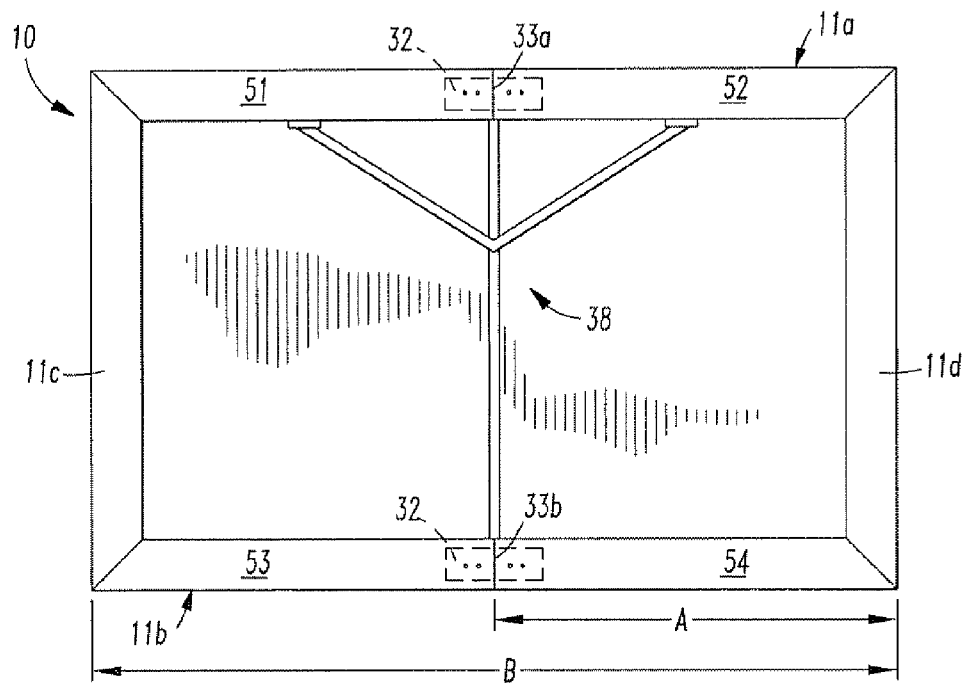
FIG. 3 is a rear view of an exemplary embodiment of the screen frame assembly in accordance with the present invention.

FIG. 3 illustrates a rear view of the exemplary embodiment of the screen assembly 10 in accordance with the present invention. As shown, the top screen-perimeter member 11a consists of left and right mating frame segments 51, 52 joined together at joint 33a by a frame-splice member 32. In this embodiment, the bottom screen-perimeter member 11b similarly consists of left and right mating frame segments 53, 54 joined together at joint 33b by an additional frame-splice member 32. Although not shown in FIG. 3, it is understood that the left and right screen-perimeter members 11c, d may likewise comprise frame splice-members 32 similar to those shown for members 11a, b, and/or that multiple frame-splice members 32 may be used to bridge multiple joints along the individual screen perimeter members 11a-d to further reduce the overall lengths of the individual mating frame segments.

In the exemplary embodiment of FIG. 3, the frame-splice members 32 span the distance between joints 33a,b, enabling the top and bottom screen-perimeter members 11a,b to be configured from separate pieces or segments 51-54. Each of these frame segments 51-54 have a length dimension A approximately one-half the overall length dimension B, which may also be referred to as the longest dimension of the frame assembly 10. As mentioned above, it is understood that multiple frame-splice members 32 may be used to bridge multiple joints in the screen-perimeter members to further reduce the overall length dimension of the frame segments with respect to the overall length dimension of the frame assembly. In FIG. 3, each frame segment 51-54 is adapted to receive a frame-splice member 32 which spans a distance across the joints 33a, 33b, respectively, thus coupling the respective frame members together to form the horizontal screen-perimeter members 11a, b. Furthermore, as mentioned above, it is understood that the left and right screen-perimeter members 11c, d may likewise comprise one or more frame splice-members 32 similar to those shown for members 11a, b.

Because screens are typically large in two dimensions and smaller in one dimension, the exemplary frame-splice members 32 shown in FIG. 3 allow the frame-assembly 10 to be constructed from a plurality of separate frame segments 51-54, wherein one or more of the screen-perimeter members 11a-d are separated into two or more frame segments 51-54, each segment being joined together by a respective frame splice member 32. In this way, the invention provides a plurality of screen-perimeter members 11a-d wherein the length dimensions of the individual frame segments are less than the largest length dimension of the screen, thus allowing the screen-perimeter members 11a-d of the frame assembly to be easily disassembled into two or more sub-members, each having an overall length shorter than the associated screen-perimeter member to facilitate more cost effective shipping and storage of the frame assembly. As a result, the shipping packages used to ship the frame assembly need only be long enough to accommodate the smaller dimension of the individual frame segments, thereby minimizing shipping and storage costs and reducing the possibility for bending or damage to the package.

As shown in FIG. 3, the frame assembly 10 may optionally comprise a tensioning device 38 to further support the frame assembly 10, thus minimizing sagging of the frame assembly and improving stability and flatness of the frame assembly. In the embodiment shown in FIG. 3, the tensioning device is generally configured into the shape of a 'Y' or 'T', although it is understood that many other shapes, such as the shape of an "I", may also be used without departing from the broader scope of the present invention. The tensioning device 38 is mounted to the frame assembly by any suitable means chosen with sound engineering judgment so as to provide additional support to the horizontal members of the frame assembly and to prevent the center of the top screen-perimeter member 11a from sagging along joint 33a. The tensioning device 38 may be biased so as to maintain the frame assembly 10 toward a straight disposition to help maintain the screen in a flat plane.

Figure 4:
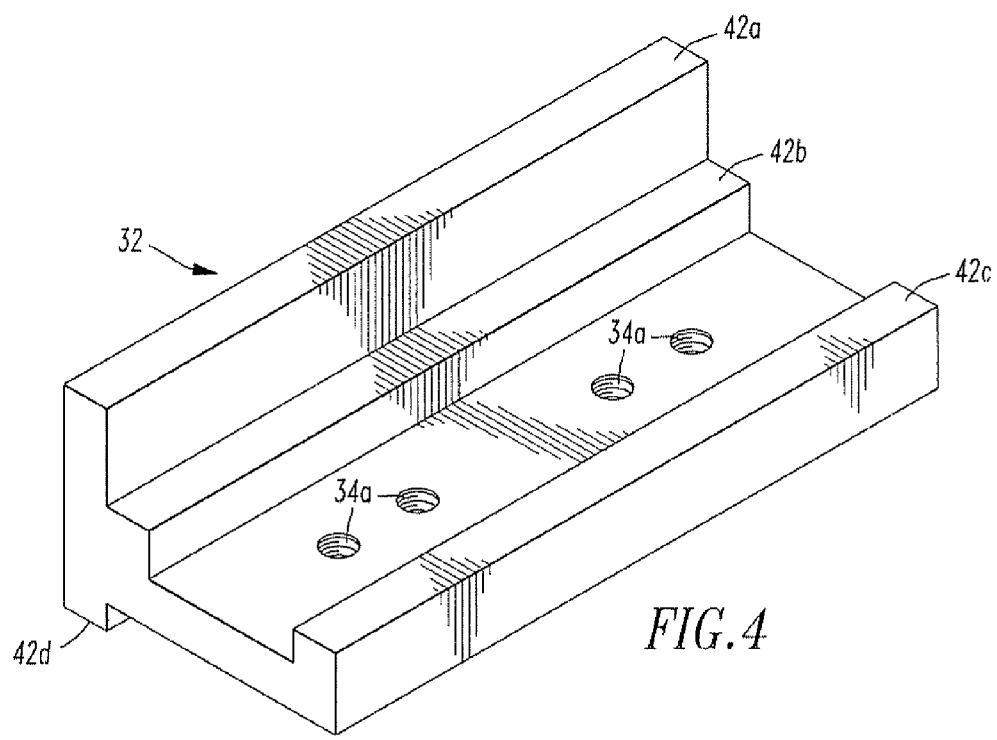
FIG. 4 is an isometric view of an exemplary frame-splice member in accordance with the present invention.
Figure 5:
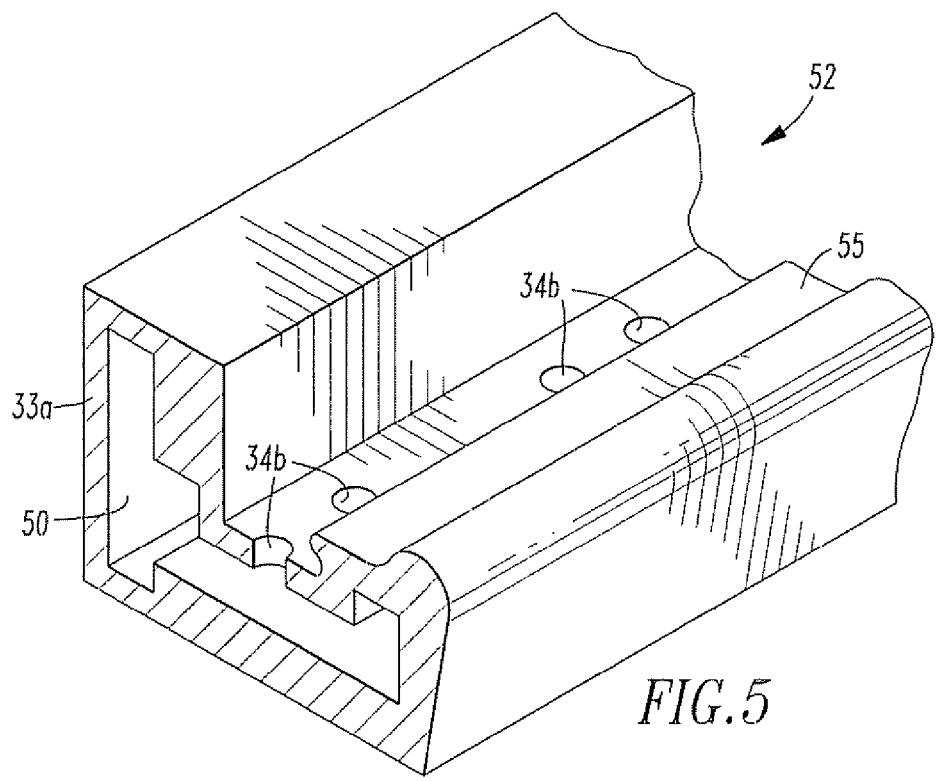
FIG. 5 is a partial isometric view of a segment of an exemplary frame-perimeter member showing an engagement region adapted to receive the exemplary frame-splice member of FIG. 4.

As best shown in FIGS. 4 and 5, splice-member 32 is configured in shape and size for a slip-fit into an engaging portion or opening 50 of the respective frame segments 51-54. The opening 50 is illustrated from the perspective of frame segment 52, but it is understood that frame segment 51 and other frame segments 53, 54 (which are not shown in FIGS. 4 and 5) would include similar openings adapted to receive one end of the splice-member 32 (for example a mirror image of opening 50) so as to couple the mating frame segments together, wherein the splice-member are inserted into the openings 50 so as to span the distance across the joints to support and hold together the frame members. To facilitate ease of assembly, the splice-members 32 and mating frame segments 51-54 comprise suitable fastening holes 34a, 34b for fastening the splice-members 32 within the openings 50 of the respective frame segments.

Figure 6:
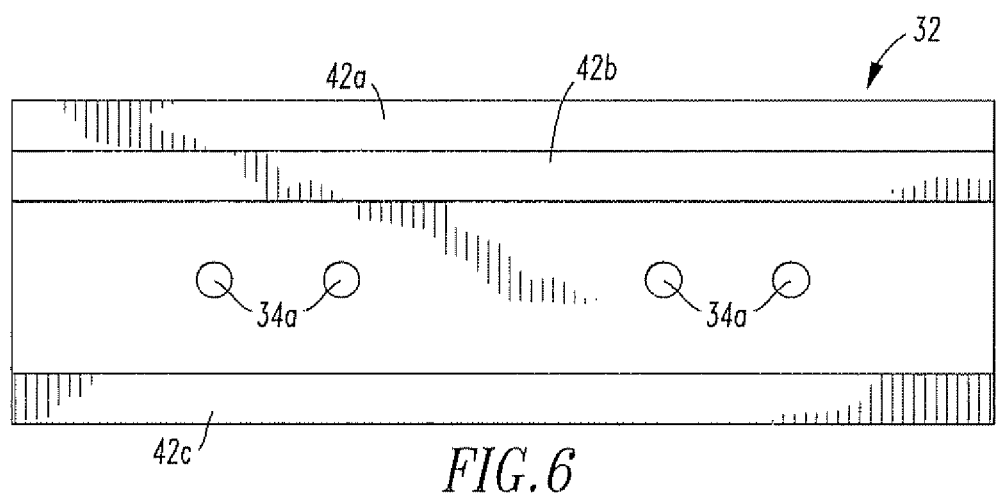
FIG. 6 is a top view of an exemplary frame-splice member similar to that of FIG. 4.

FIG. 6 illustrates an exemplary frame-splice member 32 similar to that of FIG. 4. It is understood that frame-splice members 32 may be composed of a variety of materials, including but not limited to materials such as plastics, fiberglass, carbon-fiber, aluminum, or other composite materials such as plastic coasted steel, for example. As shown in FIGS. 4 and 6, the exemplary frame-splice member 32 comprises steps or flanges 42a-d which are configured in shape and size to slide into the mating opening 50 of the respective frame members shown in FIG. 5, although it is understood the frame-splice members 32 and mating opening 50 may be configured in many different shapes and sizes chosen with sound engineering judgment to achieve the same results. A set of threaded holes 34a are also provided in the frame-splice member 32 for fastening the splice-members 32 within the openings 50 of the respective frame segments, although other fastening methods could also be used to achieve the same or similar results.

Figure 7:
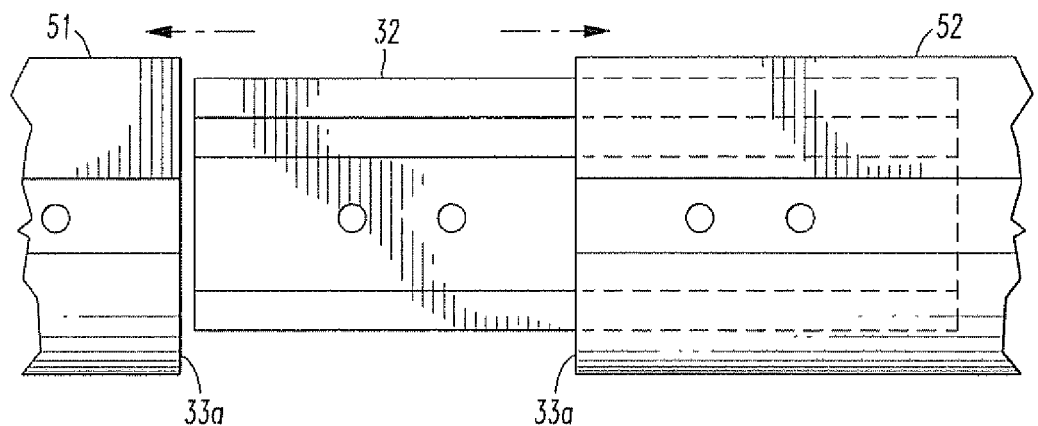
FIG. 7 is a fragmentary view of the exemplary frame-splice member of FIG. 6 inserted into an exemplary frame-perimeter member similar to that of FIG. 5.

FIG. 7 illustrates an exemplary frame-splice member 32 of FIG. 6 partially inserted into an exemplary frame segment similar to that shown in FIG. 5.

Figure 8:
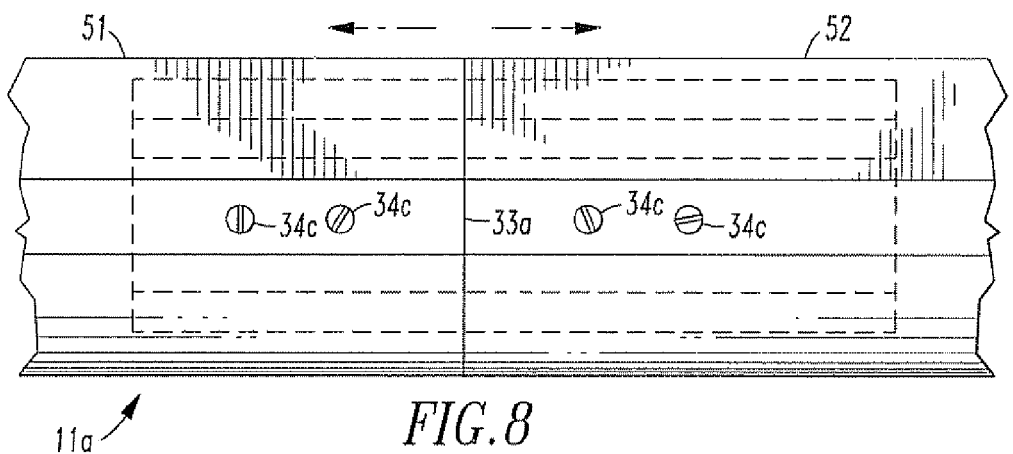
FIG. 8 is a fragmentary view of an exemplary screen frame assembly similar to that of FIG. 7 in an assembled configuration.

FIG. 8 illustrates the exemplary frame segments similar to that of FIG. 7, with the frame-splice member fully inserted into the mating frame segments. As shown, the separate frame segments 51 and 52 are joined and fastened together by the frame-splice member (hidden from view) to form a unitary screen-perimeter member 11a. In this way, the frame assembly 10 may be easily disassembled or broken down by simply removing the fasteners 34c and pulling the frame segments 51, 52 apart as indicated by the arrows so that the segments separate at the joint 33a.

The frame assembly of the present disclosure thus allows a user to easily assemble the frame assembly into a viewing configuration such that the plurality of screen-perimeter members extend the entire length of the screen perimeter so as to hold the viewing region substantially flat. The frame assembly may also be easily disassembled into multiple frame segments by simply removing the frame-splice member from the frame segments, allowing the coupled screen perimeter members to be uncoupled and split into two or more separate frame segments, each segment having a length dimension less than the overall length dimension of the assembled screen-perimeter member. In this way, the frame assembly may be disassembled for cost effective shipment and/or storage. Furthermore, the frame-splice member of the present invention remains hidden from view in the assembled configuration to create a unified structure which does not detract from the aesthetic viewing quality of the projection screen assembly.

The screen-perimeter members and frame segments may be any suitable size or shape chosen with sound engineering judgment. For example, the frame components may be rectangular, square, round, oval, C-shaped, etc., and may be rectangular tubes, square tubes, round tubes, etc. with openings configured to receive the suitable frame-splice members, and may include any suitable materials including, but not limited to, plastic, fiberglass, carbon-fiber, aluminum, etc.

The screen material may be attached to the frame in various ways well-known in the art. For example, the exemplary screen-perimeter members disclosed herein include a protrusion 55 configured in the shape of a hook so that the screen material 12 can be removably coupled or hung from the screen-perimeter members in a manner chosen with sound engineering judgment.

In addition, it is understood that in some embodiments, coupling material may be used to attach the screen assembly 10 to a wall or other surface. Since the frame components and screen may be configured to create a very light assembly, materials, such as hook and loop materials (e.g. VELCRO™), may be used to affix the screen assembly to a wall. The coupling material may be positioned in the corners of the screen such that the screen is taut when hung. The hanging and slight stretch of the screen when mounted may help result in a substantially flat screen. It is understood that other mounting devices may also be used without departing from the scope of this disclosure.

While each of the embodiments disclosed herein have been described in their preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

What is claimed is:

1. A frame assembly for a flexible projection screen system, comprising:
    a flexible screen including a screen perimeter and a viewing region interior the screen perimeter;
    at least one frame-splice member;
    a plurality of screen-perimeter members foamed by one or more frame segments, each frame segment having an enclosed opening for receiving the at least one frame splice member in a mating configuration; and
    a tensioning device connected to the one or more frame segments for increasing stability and flatness of the frame assembly;
    wherein the plurality of screen-perimeter members are selectively arrangeable into an assembled viewing configuration for holding the viewing region of the screen substantially flat, each of the at least one frame-splice member being inserted into the opening of two adjacent frame segments for forming the screen perimeter members such that the two adjacent frame segments connected by a frame splice member completely encloses and hides the at least one frame splice member from both sides of the frame assembly;
    said tensioning device being positioned to engage at least one joint formed by the joining of the two adjacent frame segments.

2. The frame assembly of claim 1 wherein the tensioning device has a generally Y-shaped structure, a generally T-shaped structure or a generally I-shaped structure.

3. The frame assembly of claim 1, wherein a length of the screen-perimeter members is equal to a length or height of the screen perimeter.

4. A frame assembly kit comprising:
    a plurality of connection members;
    a plurality of frame segments, the frame segments sized and configured for connecting together to form a screen frame configured to hold a viewing portion of a screen substantially flat; and
    a tensioning device connected to the one or more frame segments for increasing stability and flatness of the frame assembly;
    wherein each connection member is configured to fit within enclosed openings formed in ends of the frame segments such that each connection member is completely enclosed by the frame segment and is not viewable from either side of the frame assembly when assembled;
    said tensioning device being positioned to engage at least one joint formed by the joining of the two adjacent frame segments.

5. The frame assembly kit of claim 4, wherein the tensioning device has a generally Y-shaped structure, a generally T-shaped structure or a generally I-shaped structure.

6. The frame assembly of kit of claim 4 further comprising a sized and configured screen for attachment to the screen frame.

7. The frame assembly kit of claim 4 further comprising at least one covering sized and configured to cover at least a portion of the frame segments.

8. The frame assembly kit of claim 7 wherein the at least one covering is comprised of a material selected from the groups consisting of dark colored fabrics, black electrostatic velvet fabrics and light absorbing materials.

9. The frame assembly kit of claim 4 wherein each frame segment further comprises at least one projection configured to hold a portion of a screen.

10. The frame assembly kit of claim 4 further comprising at least one frame portion sized and configured for connection to the frame segments to form the screen frame.

* * * * *

UNITED STATES PATENT AND TRADEMARK OFFICE
CERTIFICATE OF CORRECTION

| | |
|---|---|
| PATENT NO. | : 8,040,602 B1 |
| APPLICATION NO. | : 12/231882 |
| DATED | : October 18, 2011 |
| INVENTOR(S) | : David L. Hochendoner |

Page 1 of 1

It is certified that error appears in the above-identified patent and that said Letters Patent is hereby corrected as shown below:

Column 5, claim 1

Line 35 "foamed" should read --formed--.

Signed and Sealed this
Thirteenth Day of December, 2011

David J. Kappos
*Director of the United States Patent and Trademark Office*